United States Patent
Hester et al.

(10) Patent No.: US 8,681,039 B2
(45) Date of Patent: Mar. 25, 2014

(54) DEVICES, METHODS, AND SYSTEMS FOR OCCUPANCY DETECTION

(75) Inventors: Lance Hester, Morristown, NJ (US); Soumitri Kolavennu, Morristown, NJ (US)

(73) Assignee: Honeywell International Inc., Morristown, NJ (US)

( * ) Notice: Subject to any disclaimer, the term of this patent is extended or adjusted under 35 U.S.C. 154(b) by 511 days.

(21) Appl. No.: 13/086,283

(22) Filed: Apr. 13, 2011

(65) Prior Publication Data

US 2012/0262327 A1   Oct. 18, 2012

(51) Int. Cl.
G01B 13/00 (2006.01)

(52) U.S. Cl.
USPC .............................. 342/27; 342/191

(58) Field of Classification Search
USPC .......................................................... 342/27
See application file for complete search history.

(56) References Cited

U.S. PATENT DOCUMENTS

| | | |
|---|---|---|
| 2002/0168943 A1 | 11/2002 | Callaway, Jr. et al. |
| 2002/0175815 A1 | 11/2002 | Baldwin |
| 2005/0236404 A1 | 10/2005 | Tsuji |
| 2009/0174552 A1 | 7/2009 | Soccoli et al. |

FOREIGN PATENT DOCUMENTS

| | | |
|---|---|---|
| EP | 2146222 A2 | 1/2010 |
| WO | 2010/030956 A2 | 3/2010 |

OTHER PUBLICATIONS

Clancy, T. C. (2007), Formalizing the interference temperature model. Wirel. Commun. Mob. Comput., 7: 1077-1086. doi: 10.1002/wcm.482.*
John T. MacDonald, et al., Interference Temperature Limits of IEEE 802.11 Protocol Radio Channels, IEEE Electro/Information Technology Conference, Chicago, Illinois, May 2007 (6 pgs.).
J. Yin, et al., Learning Adaptive Temporal Radio Maps for Signal Strength Based Location Estimation, in IEEE Transactions on Mobile Computing vol. 7, Issue 7, pp. 869-883.
T. Clancy, et al., Measuring Interference Temperature, Virginia Tech Wireless Personal Communications Symposium, Jun. 2006 (7 pgs.).
EP Search Report related to EP Application 12163057.8-2206, mailed Sep. 10, 2012 (3 pages).

* cited by examiner

*Primary Examiner* — Matthew M Barker
(74) *Attorney, Agent, or Firm* — Brooks, Cameron & Huebsch, PLLC

(57) ABSTRACT

Devices, methods, and systems for occupancy detection are described herein. One or more device embodiments include a memory and a processor. The processor is configured to execute executable instructions stored in the memory to determine an interference temperature associated with a number of radio equipped devices located in an area at a point in time, determine a radio tomographic map associated with the area at the point in time, and determine whether the area is occupied at the point in time based on the determined interference temperature and the determined radio tomographic map.

20 Claims, 5 Drawing Sheets

US 8,681,039 B2

DEVICES, METHODS, AND SYSTEMS FOR OCCUPANCY DETECTION

TECHNICAL FIELD

The present disclosure relates to devices, methods, and systems for occupancy detection.

BACKGROUND

Occupancy detection (e.g., determining whether an area is occupied by one or more individuals) can be an important part of energy management, especially home energy management. For example, the energy management settings of an area (e.g., a room in a house) can be adjusted based on whether or not an individual(s) is presently located in the area, thereby reducing and/or eliminating the waste of energy resulting from heating and/or cooling unoccupied areas.

There are many different approaches for detecting occupancy. For example, motion detectors, such as, for instance, passive infrared (PIR) detectors, can be used as occupancy detectors. However, motion detectors such as PIR detectors may not be able to accurately detect occupancy when an occupant has remained relatively still and/or motionless for an extended period of time (e.g., when the occupant is sleeping). Further, motion detectors such as PIR detectors may not be able to accurately detect occupancy in areas having a geometry and/or object(s) (e.g., walls, furniture, etc.) that create a blind spot(s) for (e.g., a location(s) in an area not visible to) the motion detector(s).

Cameras and/or radio tags can also be used to detect occupancy. However, cameras and/or radio tags may violate the privacy of an occupant(s). Further, cameras may not be able to accurately detect occupancy in low-light conditions.

DETAILED DESCRIPTION

Figure 1:
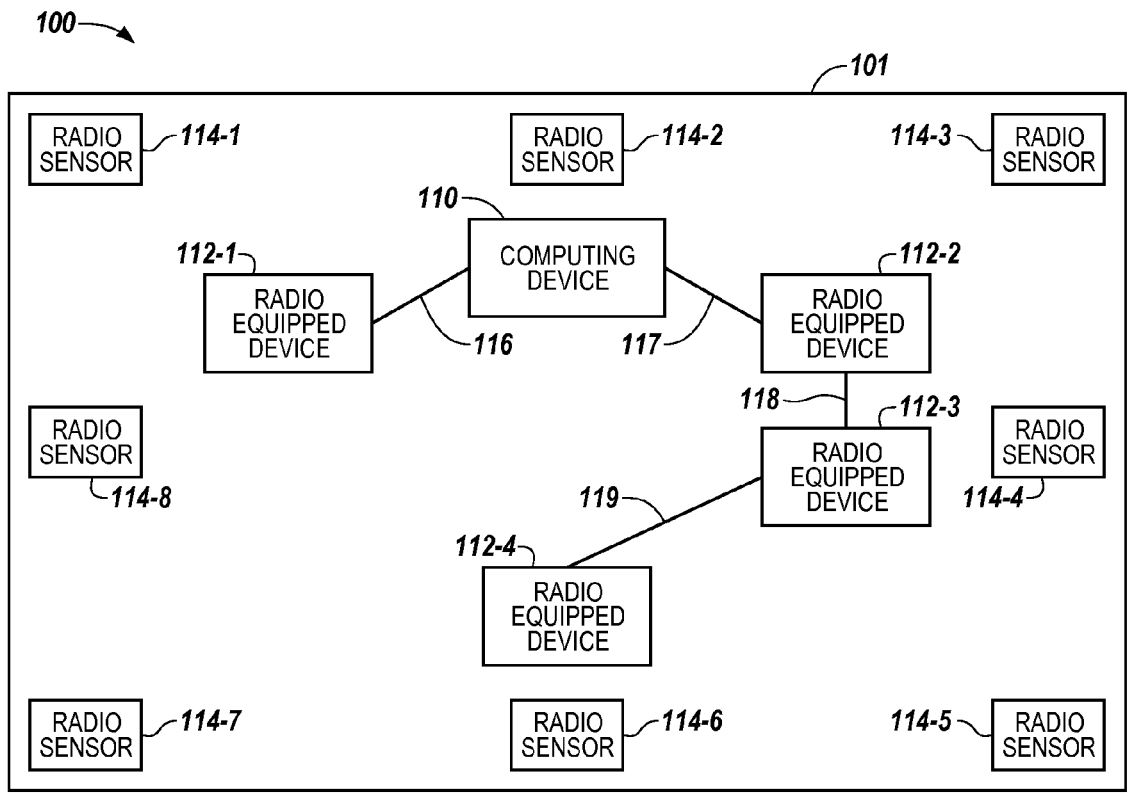
FIG. 1 illustrates a system for occupancy detection in accordance with one or more embodiments of the present disclosure.

Devices, methods, and systems for occupancy detection are described herein. One or more device embodiments include a memory and a processor. The processor is configured to execute executable instructions stored in the memory to determine an interference temperature associated with a number of radio equipped devices located in an area at a point in time, determine a radio tomographic map associated with the area at the point in time, and determine whether the area is occupied at the point in time based on the determined interference temperature and the determined radio tomographic map.

Devices, methods, and/or systems in accordance with one or more embodiments of the present disclosure can accurately detect occupancy when an occupant has remained relatively still and/or motionless for an extended period of time (e.g., when the occupant is sleeping). Additionally, embodiments of the present disclosure can accurately detect occupancy in areas having one or more blind spots. Further, embodiments of the present disclosure can accurately detect occupancy in low-light conditions. Additionally, embodiments of the present disclosure can detect occupancy without violating the privacy of an occupant(s).

In the following detailed description, reference is made to the accompanying drawings that form a part hereof. The drawings show by way of illustration how one or more embodiments of the disclosure may be practiced. These embodiments are described in sufficient detail to enable those of ordinary skill in the art to practice one or more embodiments of this disclosure. It is to be understood that other embodiments may be utilized and that process, electrical, and/or structural changes may be made without departing from the scope of the present disclosure.

The figures herein follow a numbering convention in which the first digit or digits correspond to the drawing figure number and the remaining digits identify an element or component in the drawing. Similar elements or components between different figures may be identified by the use of similar digits. For example, 110 may reference element "10" in FIG. 1, and a similar element may be referenced as 210 in FIG. 2.

As will be appreciated, elements shown in the various embodiments herein can be added, exchanged, combined, and/or eliminated so as to provide a number of additional embodiments of the present disclosure. The proportion and the relative scale of the elements provided in the figures are intended to illustrate the embodiments of the present disclosure, and should not be taken in a limiting sense.

As used herein, "a" or "a number of" something can refer to one or more such things. For example, "a number of radio sensors" can refer to one or more radio sensors.

FIG. 1 illustrates a system 100 for occupancy detection in accordance with one or more embodiments of the present disclosure. System 100 can be, for example, a wireless communication network located in an area 101. Area 101 can be, for example, a location in a building (e.g., a residential building), such as a room in a house or a dwelling in a multi-dwelling residence (e.g., an apartment in an apartment building).

As shown in FIG. 1, system 100 includes a computing device 110. Computing device 110 can be an energy management device, such as, for instance, a home energy manager (HEM), configured to manage the energy settings (e.g., heating and/or cooling) of area 101. Computing device 110 can be a multi-lingual and/or multi-interface device configured to communicate with a number of link layer interfaces such as, for instance, Ethernet, power line carrier (PLC), Wifi, Homeplug, Redlink, IEEE 802.15.4, Bluetooth, etc.

As shown in FIG. 1, system 100 includes a number of radio equipped devices 112-1, 112-2, 112-3, 112-4. Although the embodiment illustrated in FIG. 1 includes four radio equipped devices, embodiments of the present disclosure are not so limited, and can include any number of radio equipped devices located anywhere in area 101.

Radio equipped devices 112-1, 112-2, 112-3, 112-4 can be, for example, devices that can communicate with each other and/or other devices (e.g., computing device 110) via radio (e.g., radio frequency) communication. For example, the radio equipped devices can be radio equipped appliances, such as, for instance, video game consoles, video game controllers, video game headsets, routers, laptops, microwave ovens, oven ranges, drill presses, irons, washers, dryers, water heaters, pool pumps, refrigerators, etc.

In some embodiments, each radio equipped device 112-1, 112-2, 112-3, 112-4 can communicate (e.g., send and/or receive information, data, and/or signals) using the same type of radio. For example, each radio equipped device can communicate on the same radio frequency (RF) and/or channel, using the same modulation scheme, and/or in the same transmission range. In some embodiments, radio equipped devices 112-1, 112-2, 112-3, and/or 112-4 can communicate using different types of radios. For example, the radio equipped devices can communicate on different radio frequencies and/or channels, using different modulation schemes, and/or in different transmission ranges.

Computing device 110 can be in communication with radio equipped devices 112-1, 112-2, 112-3, 112-4. For example, as shown in FIG. 1, computing device 110 can have a communication link 116 with radio equipped device 112-1, a communication link 117 with radio equipped device 112-2, a communication link 118 with radio equipped device 112-3, and a communication link 119 with radio equipped device 112-4. Communication links 116 and 117 can be direct (e.g., peer-to-peer) communication links in which computing device 110 communicates directly with radio equipped devices 112-1 and 112-2, respectively. Communication link 118 can be a multi-hop communication link in which computing device 110 communicates with radio equipped device 112-3 via (e.g., through) radio equipped device 112-2. Communication link 119 can be a multi-hop communication link in which computing device 110 communicates with radio equipped device 112-4 via radio equipped devices 112-2 and 112-3.

As an example of communication between computing device 110 and radio equipped devices 112-1, 112-2, 112-3, 112-4, each radio equipped device can send device and/or service discovery information to computing device 110 when communication links 116, 117, 118, and 119 are established (e.g., during formation of the wireless communication network and/or when each radio equipped device joins or becomes a part of the wireless communication network). Such communication can use handshake and/or joining procedures associated with the wireless communication network. The device and/or service discovery information can include, for example, information, data, and/or signals reporting: the existence of the radio equipped device, whether the radio equipped device is configured to operated by a human while in use (e.g., such a video game controller, hand iron, etc.), the services and/or functions provided by the radio equipped device, the radio capabilities of the radio equipped device, the location of the radio equipped device, the energy consumption characteristics (e.g., duty cycle, average current consumption, etc.) of the radio equipped device, and/or possible wireless energy that may be emitted by the radio equipped device. For instance, the device and/or service discovery information can be a byte code indicating the radio equipped device is a particular appliance, and computing device 110 can use this code to perform a look-up on a separate database (not shown in FIG. 1) of the device and/or service discovery information.

As an additional example of communication between computing device 110 and radio equipped devices 112-1, 112-2, 112-3, 112-4, each radio equipped device can emit signals (e.g., RF signals) while in use. Computing device 110 can receive the emitted signals, and measure the amount of energy associated with each received signal. Such communication can be part of an interference temperature scan of area 101 (e.g., a measurement of the accumulated RF energy from transmissions by radio equipped devices 112-1, 112-2, 112-3, 112-4 while in use), and will be further described herein.

As shown in FIG. 1, system 100 includes a number of radio sensors 114-1, 114-2, 114-3, 114-4, 114-5, 114-6, 114-7, and 114-8. Although the embodiment illustrated in FIG. 1 includes eight radio sensors, embodiments of the present disclosure are not so limited, and can include any number of radio sensors located in area 101.

Each radio sensor 114-1, 114-2, . . . , 114-8 can be in communication with each of the other radio sensors. For example, each radio sensor 114-1, 114-2, . . . , 114-8 can have a communication link (e.g., a pair-wise communication link) with each of the other radio sensors. For instance, radio sensor 114-1 can have a first communication link with radio sensor 114-1, a second communication link with radio sensor 114-3, a third communication link with radio sensor 114-4, etc. The communication links between each radio sensor have not been illustrated in FIG. 1 so as not to obscure one or more embodiments of the present disclosure.

As an example of communication between the radio sensors, each radio sensor 114-1, 114-2, . . . , 114-8 can send signals (e.g., RF signals) to each of the other radio sensors. Each radio sensor 114-1, 114-2, . . . , 114-8 can receive the signals sent from each of the other radio sensors, and measure the strength of each received signal. Such communication can be part of a radio tomographic scan of area 101 (e.g., a measurement of RF signal strengths of radio frequencies on a number of paths through area 101), and will be further described herein.

Each radio sensor 114-1, 114-2, . . . , 114-8 can also be in communication with computing device 110. For example, each radio sensor can have a communication link with computing device 110. The communication link between a radio sensor 114-1, 114-2, . . . , 114-8 and computing device 110 can be a direct communication link in which the radio sensor communicates directly with computing device 110, or a multi-hop communication link in which the radio sensor communicates with computing device 110 via one or more of the other radio sensors. Further, the communication links between each radio sensor and computing device 110 can be wireless or wired (e.g., PLC or Ethernet) communication links. The communication links between each radio sensor and computing device 110 have not been illustrated in FIG. 1 so as not to obscure one or more embodiments of the present disclosure.

As an example of communication between each radio sensor 114-1, 114-2, . . . , 114-8 and computing device 110, each radio sensor can send its signal strength measurements to computing device 110. Such communication can be part of a radio tomographic scan of area 101, and will be further described herein.

Figure 2:
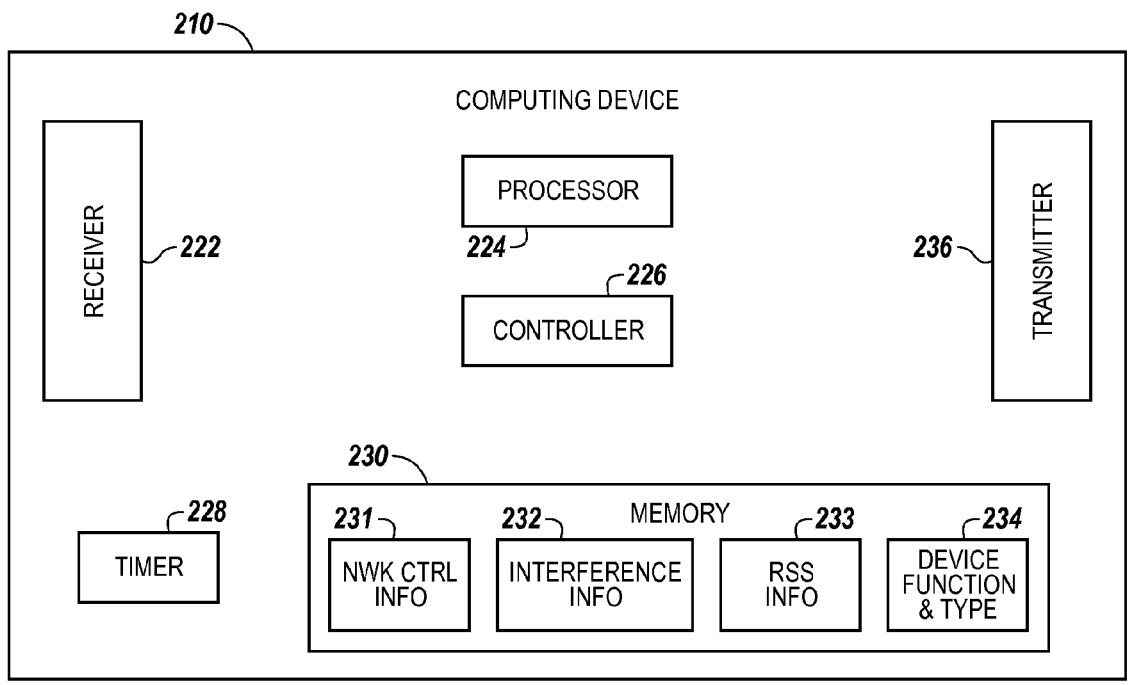
FIG. 2 illustrates a computing device for occupancy detection in accordance with one or more embodiments of the present disclosure.

FIG. 2 illustrates a computing device 210 for occupancy detection in accordance with one or more embodiments of the present disclosure. Computing device 210 can be, for example, computing device 110 previously described in connection with FIG. 1. Additionally, computing device 210 can be analogous to one or more of radio equipped devices 112-1, 112-2, 112-3, 112-4 and/or radio sensors 114-1, 114-2, . . . , 114-8 previously described in connection with FIG. 1 (e.g., radio equipped devices 112-1, 112-2, 112-3, 112-4 and/or radio sensors 114-1, 114-2, . . . , 114-8 can include one or more components analogous to those described herein in connection with computing device 210).

As shown in FIG. 2, computing device 210 includes a receiver 222, a processor 224, a controller 226, a timer 228, a memory 230, and a transmitter 236. Receiver 222 can receive communications from other devices, such as, for example, communications from radio equipped devices 112-1, 112-2, 112-3, 112-4 and/or radio sensors 114-1, 114-2, . . . , 114-8 previously described in connection with FIG. 1. Transmitter 236 can send communications from computing device 210 to other devices.

Although receiver 222 and transmitter 236 are separate in the embodiment illustrated in FIG. 2, embodiments of the present disclosure are not so limited. For example, in some embodiments, computing device 210 may include a wireless communication interface card (e.g., a radio transceiver) that can function as both a receiver and a transmitter. Further, although the embodiment illustrated in FIG. 2 includes one receiver and one transmitter, embodiments of the present disclosure are not so limited, and can include any number of receivers and/or transmitters (e.g., any number of wireless communication interface cards).

Processor 224 can process the received communications under the direction of controller 226. The timing of controller 226 can be provided by timer 228. Memory 230 can store data, such as, for example, network control information 231, interference information 232, received signal strength information 233, and device functionality and type information 234, among other types of data.

Memory 230 can be volatile or nonvolatile memory. Memory 230 can also be removable, e.g., portable memory, or non-removable, e.g., internal memory. For example, memory 230 can be random access memory (RAM), read-only memory (ROM), dynamic random access memory (DRAM), electrically erasable programmable read-only memory (EEPROM), flash memory, phase change random access memory (PCRAM), compact-disk read-only memory (CD-ROM), a laser disk, a digital versatile disk (DVD) or other optical disk storage, and/or a magnetic medium such as magnetic cassettes, tapes, or disks, among other types of memory.

Further, although memory 230 is illustrated as being located in computing device 210, embodiments of the present disclosure are not so limited. For example, memory 230 can also be located internal to another computing resource, e.g., enabling computer readable instructions to be downloaded over the Internet or another wired or wireless connection.

Processor 224 can execute executable instructions stored in memory 230 to detect occupancy in accordance with one or more embodiments of the present disclosure. For example, processor 224 can execute the executable instructions stored in memory 230 to perform one or more of the methods for detecting occupancy further described herein (e.g., in connection with FIGS. 3, 4, 5, and/or 6).

Figure 3:
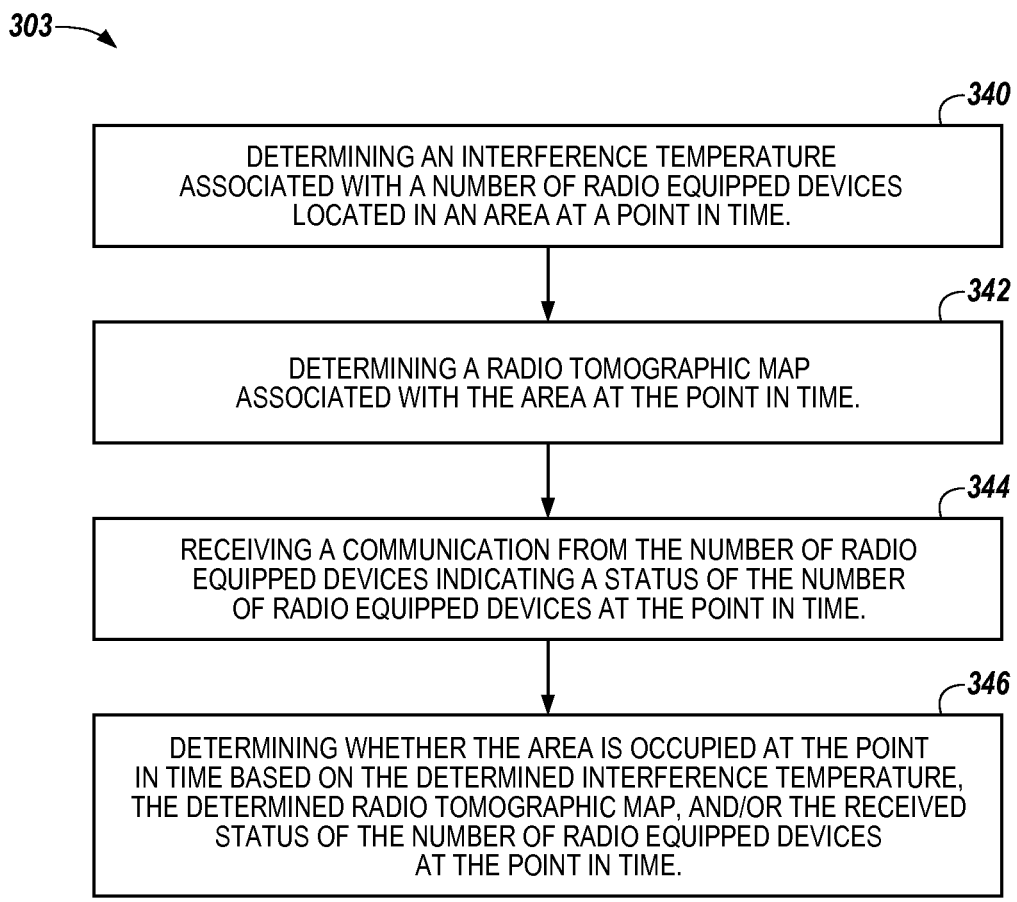
FIG. 3 illustrates a method for occupancy detection in accordance with one or more embodiments of the present disclosure.

FIG. 3 illustrates a method 303 for occupancy detection in accordance with one or more embodiments of the present disclosure. Method 303 can be performed, for example, by computing device 110 and/or 210 previously described in connection with FIGS. 1 and 2, respectively, to determine whether area 101 previously described in connection with FIG. 1 is occupied (e.g., by one or more individuals).

At block 340, method 303 includes determining an interference temperature associated with a number of radio equipped devices located in an area (e.g., area 101) at a point in time. The number of radio equipped devices can be, for example, radio equipped devices 112-1, 112-2, 112-3, 112-4 previously described in connection with FIG. 1.

Interference temperature can be a measurement of how well a radio operating with a particular protocol and modulation scheme can tolerate interference in its spectrum, and can include keeping account of the accumulated RF energy from radio transmissions. For example, computing devices 110 and/or 210 can perform interference temperature (e.g., RF energy) measurements for each radio equipped device 112-1, 112-2, 112-3, 112-4 to put together interference maps for each radio equipped device and thereby measure the cumulative interference temperature (e.g., the cumulative RF energy) for the overall space of area 101.

As an example, computing devices 110 and/or 210 can record the RF signatures (e.g., received energy and/or power levels) of radio equipped devices 112-1, 112-2, 112-3, 112-4. Because computing devices 110 and/or 210 may be aware of the existence of the radio equipped devices and the possible wireless energy that may be emitted by the radio equipped device from the device and/or service discovery communications previously described herein, computing devices 110 and/or 210 may have developed baseline profiles of the RE energy the radio equipped devices exhibit when in use (e.g., when in an active mode versus a standby mode). Accordingly, computing devices 110 and/or 210 can determine when a radio equipped device 112-1, 112-2, 112-3, 112-4 is in use based on the recorded RE signatures of the radio equipped devices (e.g., by comparing the recorded RF signatures to the baseline profiles). For example, computing devices 110 and/or 210 can determine when a router is on, versus on and engaged in data uploading and/or downloading, based on its duty cycle as indicated by the amount of RF energy the router is emitting and/or the duration of the activity. As an additional example, computing devices 110 and/or 120 can determine microwave oven usage based on device and/or service discovery information that informs computing devices 110 and/or 120 that a microwave that emits energy at a particular power and results in a particular spectral power density when in use is located in area 101, and a rise in interference temperature caused by the microwave's usage.

Interference temperature can be given by the following equation:

$$T_i = (I(f_c, W)/Wk)$$

Where I is the average interference power in Watts centered at a frequency $f_c$ covering a receiver bandwidth W measured in Hertz, k is Boltzmann's constant, and $T_i$ is the measure of the interference power in Kelvins.

The interference temperature associated with the number of radio equipped devices located in the area at the point in time can be determined, for example, using a number of interference temperature thresholds. Determining the interference temperature associated with the number of radio equipped devices located in the area at the point in time will be further described herein (e.g., in connection with FIG. 4).

At block 342, method 303 includes determining a radio tomographic (e.g., path loss) map associated with the area at the point in time. The radio tomographic map can be determined using, for example, radio tomography (e.g., radio tomography imaging).

Radio tomography can create an image from the attenuation caused by an object blocking pairs of communicating radio devices (e.g., radio sensors 114-1, 114-2, . . . , 114-8 previously described in connection with FIG. 1). For example, radio tomography can measure the RF signal strengths of radio frequencies through a number of different paths through an area (e.g., area 101). These measurements can create projections that can be used to construct an image outlining an object blocking the paths. Accordingly, radio tomography can be used to determine the existence of the object in the area.

As an example, when an individual enters an area (e.g., area 101) having a number of radio sensors (e.g., radio sensors 114-1, 114-2, ..., 114-8) and communication links between the radio sensors (e.g., pair-wise communication links as previously described herein), the RF waves forming the communication links may undergo some attenuation (e.g., be absorbed, diffracted, reflected, and/or scattered by the individual). This effect can be referred to as shadowing loss. Accordingly, observing the shadowing loss across the communication links at different points in time can indicate that an individual that had not previously been present in the area is now present.

Path loss can be a function of shadowing loss, and can be generalized to received signal power. For example, the path loss between a pair of radio sensors can be measured by comparing differences in received power of a radio signal from one of the radio sensors at a first point in time to received power of a radio signal sent from the same radio sensor at a second point in time.

The received signal power (e.g., signal strength) can be given by the following equation:

$$P_R = P_T - L_F - L_S - L_D - N$$

Where $P_R$ is the received signal power in dB, $P_T$ is the transmitted signal power in dB, $L_F$ is the fading loss in dB that results from constructive and destructive interference, $L_S$ is the shadowing loss in dB due to object attenuation, $L_D$ is the static loss in dB due to antenna patterns, and N is the measurement noise in dB.

Figure 5:
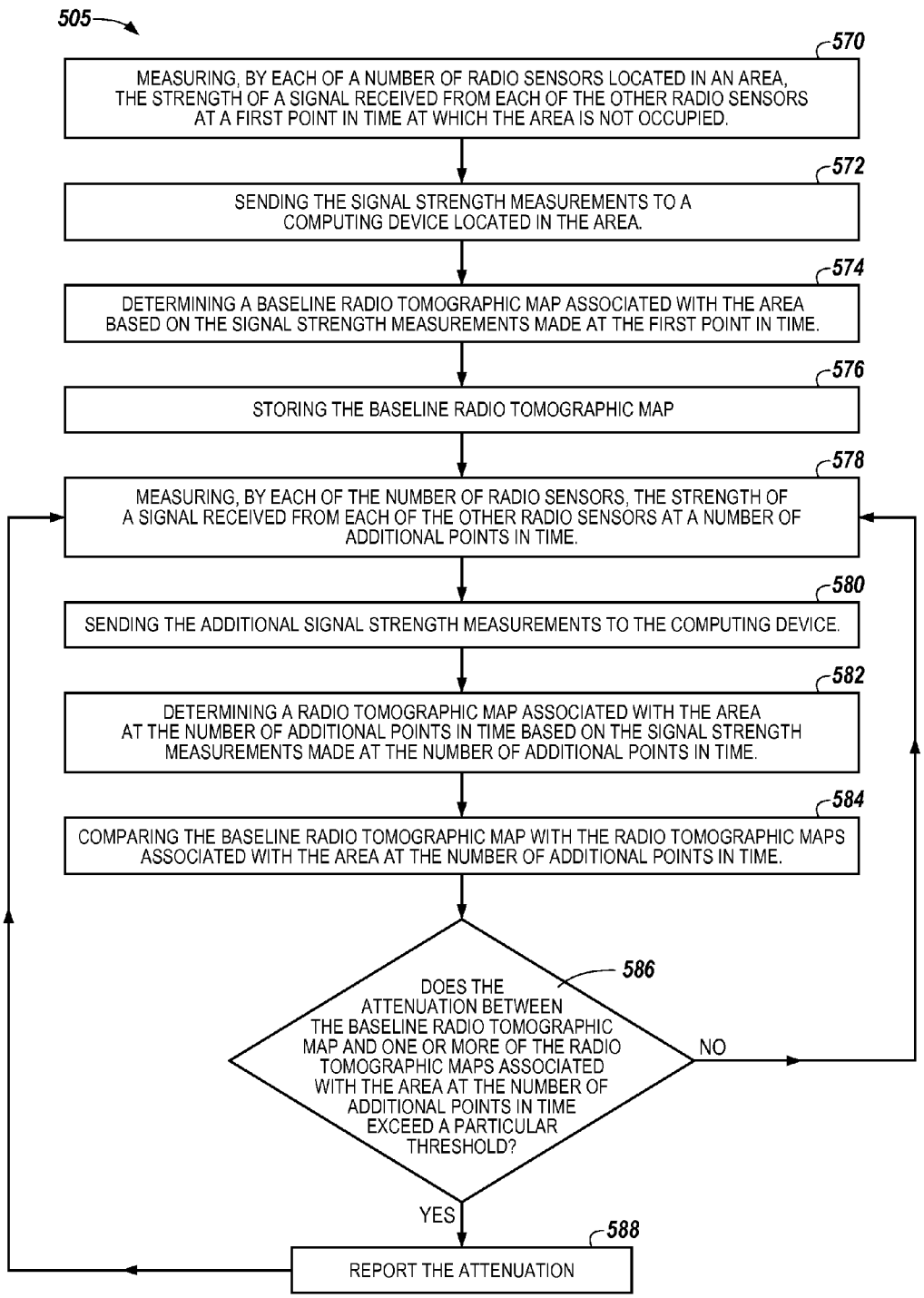
FIG. 5 is a flow chart illustrating a method for determining a radio tomographic map in accordance with one or more embodiments of the present disclosure.

Determining the path loss map associated with the area at the point in time will be further described herein (e.g., in connection with FIG. 5). That is, determining the radio tomographic map associated with the area at the point in time will be further described herein (e.g., in connection with FIG. 5).

At block 344, method 303 includes receiving a communication from the number of radio equipped devices indicating a status of the number of radio equipped devices at the point in time. The status of each radio equipped device can indicate, for example, whether the radio equipped device is in use (e.g., on and/or in operation) at the point in time.

The status communications can be made, for example, through communication links 116, 117, 118, and/or 119, as previously described herein. The status communications can include, for example, information, data, and/or signals sent from the number of radio equipped devices reporting the status of the radio equipped devices at the point in time.

At block 346, method 303 includes determining whether the area is occupied (e.g., whether one or more individuals are located in the area) at the point in time based on (e.g., by processing) the determined interference temperature, the determined radio tomographic map, and/or the received status of the number of radio equipped devices at the point in time. Determining whether the area is occupied at the point in time will be further described herein (e.g., in connection with FIG. 6).

Figure 4:
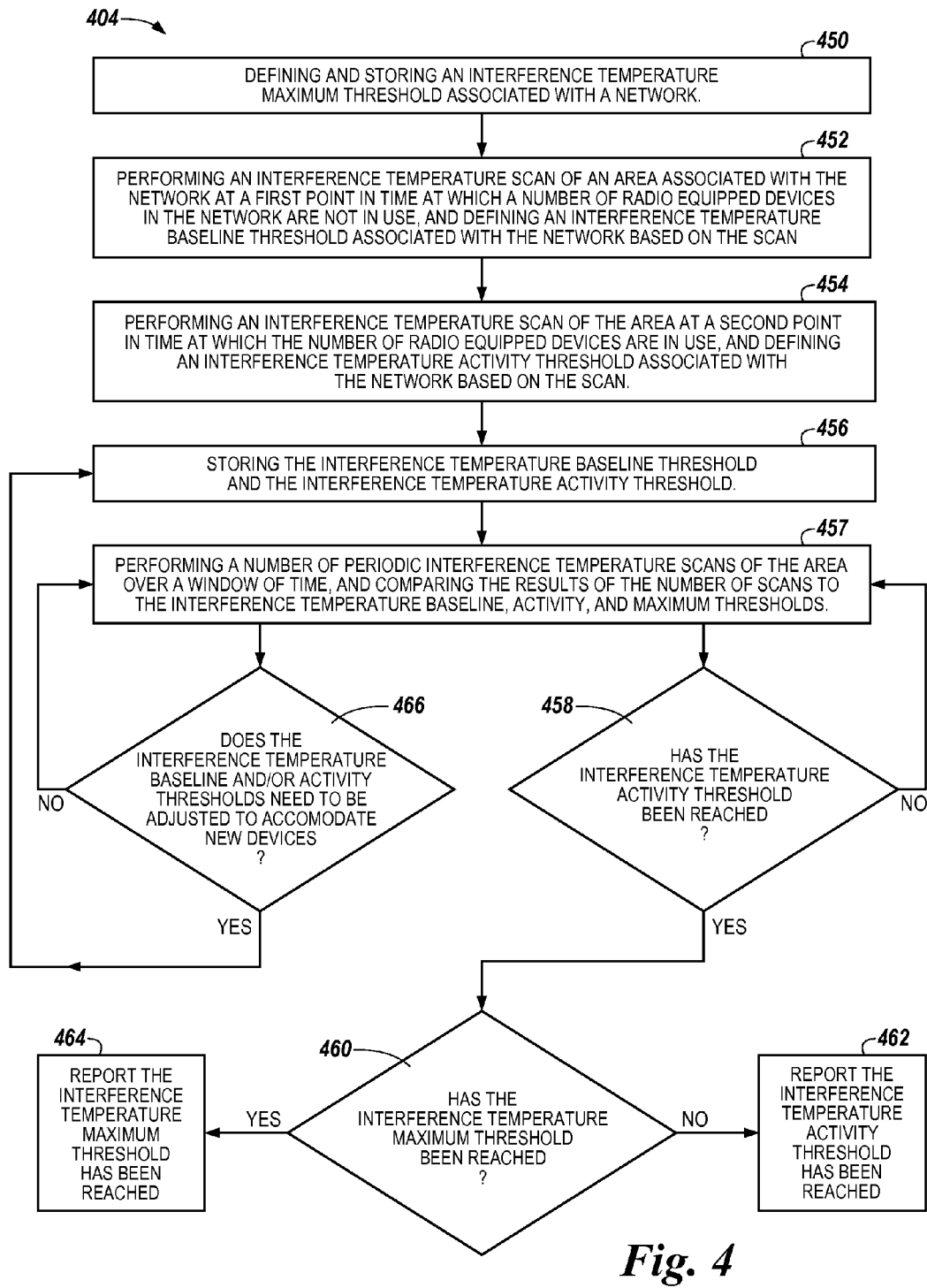
FIG. 4 is a flow chart illustrating a method for determining an interference temperature in accordance with one or more embodiments of the present disclosure.

FIG. 4 is a flow chart 404 illustrating a method for determining an interference temperature in accordance with one or more embodiments of the present disclosure. The method illustrated in flow chart 404 can be a part of step 340 of method 303 previously described in connection with FIG. 3. The method illustrated in flow chart 404 can be performed, for example, by computing device 110 and/or 210 previously described in connection with FIGS. 1 and 2, respectively.

At step 450, an interference temperature maximum threshold (Tmaximum) associated with a network is defined and stored. The network can be, for example, the wireless communication network located in an area 101 previously described in connection with FIG. 1. Tmaximum can be stored, for example, in memory 230 previously described in connection with FIG. 2.

Tmaximum can be, for example, the cumulative interference temperature (e.g., the cumulative RF energy) level at which wireless communication in the network may fail. For example, Tmaximum can be the cumulative interference temperature level at which interference from transmitting radio equipped devices (e.g., radio equipped devices 112-1, 112-2, 112-3, 112-4 previously described in connection with FIG. 1) in the network may adversely effect (e.g., clobber) the transmissions of each other and/or a primary transmitter (e.g., computing device 110) in the network. That is, Tmaximum can correspond to the maximum amount of tolerable interference for a given frequency band for the network (e.g., for area 101).

At step 452, an interference temperature scan of an area associated with the network (e.g., area 101) is performed at a first point in time at which a number of radio equipped devices (e.g., radio equipped devices 112-1, 112-2, 112-3, 112-4) in the network are not in use (e.g., off and/or not in operation), and an interference temperature baseline threshold (Tbaseline) associated with the network (e.g., associated with the radio equipped devices) is defined based on the scan. That is, Tbaseline can be an interference temperature level corresponding to no wireless communication in the network or a minimum level of wireless communication in the network, indicating that the radio equipped devices are off or in standby (e.g., quiescent) mode. The minimum level of communication can include, for example, periodic beacon or "Hello" messages from the radio equipped devices, but not sustained communication.

The interference temperature scan can include, for example, receiving (e.g., by receiver 222 previously described in connection with FIG. 2) any signals (e.g., RF signals) emitted by the radio equipped devices at the first point in time, and measuring the amount of energy associated with the received signals. Tbaseline can then be determined based on the measured amount of energy associated with the received signals.

At step 454, an interference temperature scan of the area is performed at a second point in time at which the number of radio equipped devices are in use (e.g., on and/or in operation), and an interference temperature activity threshold (Tactivity) associated with the network (e.g., associated with the radio equipped devices) is defined based on the scan. That is, Tactivity can be an interference temperature level corresponding to a level of wireless communication in the network that indicates at least one of the radio equipped devices is actively being used. Tactivity may be greater than Tbaseline and/or less then Tmaximum.

The interference temperature scan performed at the second point in time can include, for example, receiving (e.g., by receiver 222 previously described in connection with FIG. 2) signals (e.g., RF signals) emitted by the radio equipped devices at the second point in time, and measuring the amount of energy associated with the received signals. Tactivity can then be determined based on the measured amount of energy associated with the signals received at the second point in time.

At step 456, Tbaseline and Tactivity are stored. Tbaseline and Tactivity can be stored, for example, in memory 230 previously described in connection with FIG. 2.

At step 457, a number of periodic interference temperature scans of the area are performed over a window of time, and the results of the number of scans are compared to Tbaseline, Tactivity, and Tmaxium. The window of time in which the number of periodic scans are performed can be after the first and second points in time (e.g., after Tbaseline, Tactivity, and Tmaximum are defined).

Each periodic interference temperature scan can include, for example, receiving (e.g., by receiver 222 previously described in connection with FIG. 2) signals (e.g., RF signals) emitted by the radio equipped devices at a different point in time over the window of time, and measuring the amount of energy associated with the received signals. The measured amount of energy associated with the signals received at each different point in time can then be compared to Tbaseline, Tactivity, and Tmaximum.

If at step 458 the comparison of the measured amount of energy associated with the signals received at each different point in time indicates that Tactivity has been reached (e.g., met or exceeded) during the window of time (e.g., at one or more points in time during the window of time), the method proceeds to step 460. If at step 460 the comparison of the measured amount of energy associated with the signals received at each different point in time indicates that Tmaximum has been reached during the window of time, a report is made at step 464 indicating that Tmaximum has been reached during the window in time (e.g., at the one or more points in time during the window of time). If at step 460 the comparison indicates that Tmaximum has not been reached during the window of time, a report is made at step 462 indicating that Tactivity has been reached during the window in time. If at step 458 the comparison indicates that Tactivity has not been reached during the window in time, the method returns to step 457.

In some embodiments, the report made at step 462 can indicate that one or more of the number of radio equipped devices are in use during the window in time (e.g., at the one or more points in time during the window in time), and in some embodiments, the report made at step 464 can indicate that one or more of the number of radio equipped devices are in use during the window of time. That is, in some embodiments, one or more of the number of radio equipped devices may be in use if Tactivity has been reached (e.g., met or exceeded) during the window in time (e.g., at one or more points in time during the window of time), and in some embodiments, one or more of the number of radio equipped devices may be in use if Tmaximum has been reached during the window in time.

At step 466, a determination of whether Tbaseline and/or Tactivity need to be adjusted to accommodate new devices (e.g., additional radio equipped devices that have been added to the network after Tbaseline and/or Tactivity have been defined) is made. If Tbaseline and/or Tactivity need to be adjusted to accommodate new devices, the method returns to step 456. If Tbaseline and/or Tactivity do not need to be adjusted to accommodate new devices, the method returns to step 457.

FIG. 5 is a flow chart 505 illustrating a method for determining a radio tomographic map in accordance with one or more embodiments of the present disclosure. The method illustrated in flow chart 505 can be a part of step 342 of method 303 previously described in connection with FIG. 3.

At step 570, the method includes measuring, by each of a number of radio sensors located in an area, the strength of a signal (e.g., an RF signal) received from each of the other radio sensors at a first point in time at which the area is not occupied. The number of radio sensors can be, for example, radio sensors 114-1, 114-2, . . . , 114-8 previously described in connection with FIG. 1, and the area can be, for example, area 101 previously described in connection with FIG. 1. The signals can be, for example, test messages sent by each radio sensor in order to obtain the signal strength measurements. Each radio sensor can store its signal strength measurements, along with identification information for each signal strength measurement identifying which of the other radio sensors sent each signal.

At step 572, the signal strength measurements are sent (e.g., from the radio sensors) to a computing device located in the area. That is, the computing device (e.g., a receiver of the computing device) can receive the signal strength measurements from the radio sensors. The computing device can be, for example, computing device 110 and/or 210 previously described in connection with FIG. 2 (e.g., the receiver of the computing device can be receiver 222 previously described in connection with FIG. 2). The radio sensors can also send the identification information for each signal strength measurement to the computing device.

At step 574, a baseline radio tomographic (e.g., path loss) map associated with the area (e.g., with the space defined by the radio sensors) is determined (e.g., constructed) based on the signal strength measurements made at the first point in time. The baseline radio tomographic map can be determined by, for example, the computing device. In some embodiments, if the computing device has knowledge of the propagation environment and the locations and types of the radio sensors, the computing device can determine the baseline radio tomographic path based on that knowledge.

At step 576, the baseline radio tomographic map is stored. The baseline radio tomographic map can be stored, for example, by the computing device (e.g., in memory 230 of the computing device previously described in connection with FIG. 2).

At step 578, the method includes measuring, by each of the number of radio sensors, the strength of a signal (e.g., an RF signal) received from each of the other radio sensors at a number of additional points in time. The number of additional points in time can, for example, correspond to the points in time at which the periodic interference temperature scans previously described in connection with FIG. 4 are performed. The signals can be, for example, signals sent by each radio sensor as part of radio signal strength measurement campaigns performed at the number of additional points in time.

At step 580, the additional signal strength measurements (e.g., the signal strength measurements made at the additional points in time) are sent (e.g., from the radio sensors) to the computing device. That is, the computing device (e.g., the receiver of the computing device) can receive the additional signal strength measurements from the radio sensors. The computing device can store the received additional signal strength measurements (e.g., in the memory of the computing device).

At step 582, a radio tomographic (e.g., path loss) map associated with the area (e.g., with the space defined by the radio sensors) at the number of additional points in time is determined (e.g., generated) based on the signal strength measurements made at the number of additional points in time. The radio tomographic maps can be determined by, for example, the computing device.

At step 584, the baseline radio tomographic map is compared with the radio tomographic maps associated with the area at the number of additional points in time. That is, the baseline radio tomographic map is compared with the signal strength measurements made at the number of additional points in time. The comparison of the radio tomographic maps can be performed by, for example, the computing device.

If at step 586 the comparison of the baseline radio tomographic map and the radio tomographic maps associated with the area at the additional points in time indicates that the attenuation between the baseline radio tomographic map and one or more of the radio tomographic maps associated with the area at the number of additional points in time exceed a particular (e.g., pre-determined) threshold the attenuation is reported at step 588. That is, a report is made at step 588 indicating that the attenuation between the baseline radio tomographic map and one or more of the radio tomographic maps associated with the area at the number of additional points in time (e.g., the signal strength measurements made at one or more of the number of additional points in time) exceeds the particular threshold. The method then returns to step 578. If at step 586 the comparison indicates that the attenuation between the baseline radio tomographic map and the radio tomographic maps associated with the area at the number of additional points in time does not exceed the particular threshold, the method returns to step 578.

The report made at step 588 can indicate that one or more individuals and/or objects are located in (e.g., have entered) the area at one or more of the additional points in time. For example, one or more individuals and/or objects may be located in the area at one of the additional points in time if the attenuation between the baseline radio tomographic map and the radio tomographic map associated with the area at that additional point in time exceeds the particular threshold.

In some embodiments, if the attenuation is reported at step 588 (e.g., if it is determined that one or more individuals and/or objects are located in the area at one or more of the additional points in time), the computing device can determine the location(s) of the one or more individuals and/or objects in the area. The computing device can determine the location(s) of the one or more individuals and/or objects by, for example, associating the location(s) of the one or more individuals and/or objects to the location of the radio sensors experiencing the attenuation.

Figure 6:
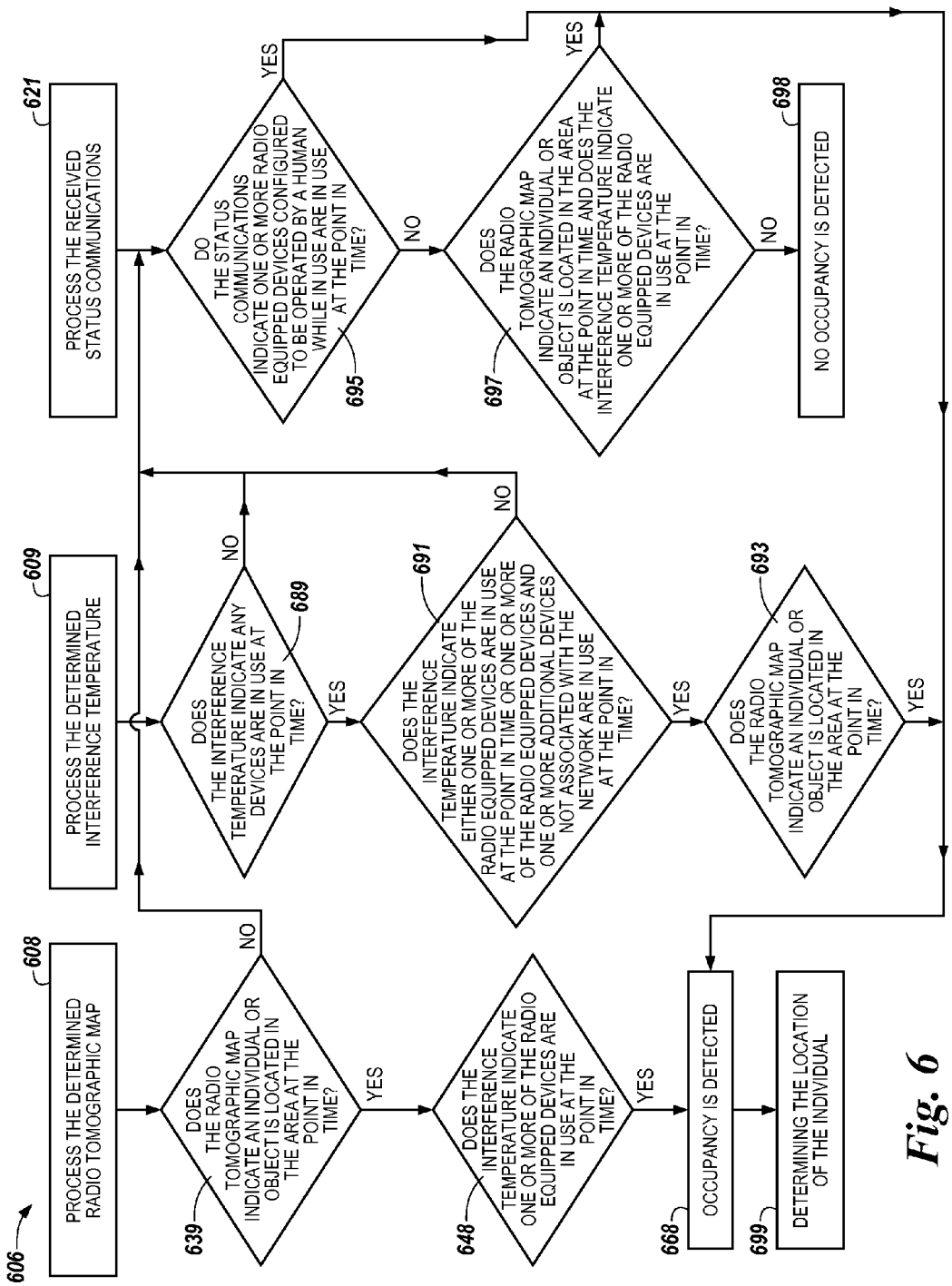
FIG. 6 is a flow chart illustrating a method for determining whether an area is occupied at a point in time in accordance with one or more embodiments of the present disclosure.

FIG. 6 is a flow chart 606 illustrating a method for determining whether an area (e.g., area 101 previously described in connection with FIG. 1) is occupied at a point in time in accordance with one or more embodiments of the present disclosure. The method illustrated in flow chart 606 can be a part of step 346 of method 303 previously described in connection with FIG. 3. The method illustrated in flow chart 606 can be performed, for example, by computing device 110 and/or 210 previously described in connection with FIGS. 1 and 2, respectively.

At step 608, the tomographic map determined at step 342 of FIG. 3 previously described herein (e.g., determined in accordance with the method previously described herein in connection with FIG. 5) is processed. At step 609, the interference temperature determined at step 340 of FIG. 3 (e.g., determined in accordance with the method previously described herein in connection with FIG. 4) is processed. At step 621 the status communications received at step 344 of FIG. 3 are processed.

If at step 639 the radio tomographic map indicates an individual or object is located in the area at the point in time, the method proceeds to step 648. If at step 639 the radio tomographic map does not indicate an individual or object is located in the area at the point in time, the method proceeds to step 695. The radio tomographic map can indicate an individual or object is located in the area at the point in time if, for example, the attenuation between the radio tomographic map and a baseline radio tomographic map exceeds a particular threshold, as previously described herein (e.g., in connection with FIG. 5).

If at step 648 the interference temperature indicates one or more of the radio equipped devices (e.g., radio equipped devices 112-1, 112-2, 112-3, 112-4 previously described in connection with FIG. 1) are in use (e.g., on and/or in operation) at the point in time, the method proceeds to step 668. The interference temperature can indicate one or more of the radio equipped devices are in use at the point in time if, for example, the interference temperature meets or exceeds an interference temperature threshold (e.g., an interference temperature activity threshold and/or an interference temperature maximum threshold), as previously described herein (e.g., in connection with FIG. 4).

At step 668, occupancy is detected. That is, the area is determined to be occupied (e.g., one or more individuals are determined to be located in the area) at the point in time if step 668 is reached. A report can be made indicating that occupancy of the area has been detected.

If at step 689 the interference temperature indicates any devices are in use at the point in time, the method proceeds to step 691. If at step 689 the interference temperature does not indicate any devices are in use at the point in time, the method proceeds to step 695.

If at step 691 the interference temperature does not indicate either one or more of the radio equipped devices are in use at the point in time or one or more of the radio equipped devices and one or more additional devices not associated with the network (e.g., the network previously described in connection with FIG. 1) are in use at the point in time, the method proceeds to step 695. That is, the method proceeds to step 695 if the sole source of the interference temperature is one or more additional devices not associated with the network (e.g., one or more non-network devices). The one or more additional devices not associated with the network may, for example, be associated with a different network, such as, for instance, a different network located in a different area of the building. For example, the one or more additional devices may be associated with a network located in a different dwelling of a multi-dwelling residence (e.g., with a network located in a different apartment of an apartment building).

If at step 691 the interference temperature indicates either one or more of the radio equipped devices are in use at the point in time or one or more of the radio equipped devices and one or more additional devices not associated with the network are in use at the point in time, the method proceeds to step 693. That is, if the sole source of the interference temperature is one or more devices associated with the network (e.g., one or more network devices), or if the source of the interference temperature is one or more network devices operating together with a non-network device in the network space (e.g., area 101), the method proceeds to step 693. If at step 693 the radio tomographic map indicates an individual or object is located in the area at the point in time, the method proceeds to step 668 (e.g., occupancy is detected).

If at step 695 the status communications indicate one or more radio equipped devices configured to be operated by a human while in use are in use at the point in time, the method proceeds to step 668 (e.g., occupancy is detected). If at step 695 the status communications does not indicate one or more radio equipped devices configured to be operated by a human while in use are in use at the point in time, the method proceeds to step 697. Whether a radio equipped device is configured to be operated by a human while in use can be determined based on device and/or service discovery information previously received from the radio equipped device, as previously described herein (e.g., in connection with FIG. 1).

If at step 697 the radio tomographic map indicates an individual or object is located in the area at the point in time, and the interference temperature indicates one or more of the radio equipped devices are in use at the point in time, the method proceeds to step 668. If at step 697 the radio tomographic map does not indicate an individual or object is located in the area at the point in time, or the interference temperature does not indicate one or more of the radio equipped devices are in use at the point in time, the method proceeds to step 698.

At step 698, no occupancy is detected. That is, the area is determined to be unoccupied (e.g., no individuals are determined to be located in the area) at the point in time if step 698 is reached. A report can be made indicating that no occupancy of the area has been detected.

At step 699 (e.g., if occupancy has been detected), the location of the individual (e.g., in the area) is determined. The location of the individual can be determined based on, for example, the location of the radio sensors and/or device and/or service discovery information previously received from the radio equipped devices such as, for instance, the location of the radio equipped devices.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the disclosure includes any other applications in which the above structures and methods are used. Therefore, the scope of various embodiments of the disclosure should be determined with reference to the appended claims, along with the full range of equivalents to which such claims are entitled.

In the foregoing Detailed Description, various features are grouped together in example embodiments illustrated in the figures for the purpose of streamlining the disclosure. This method of disclosure is not to be interpreted as reflecting an intention that the embodiments of the disclosure require more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed:

1. A computing device for occupancy detection, comprising:
    a memory; and
    a processor configured to execute executable instructions stored in the memory to:
        determine an interference temperature associated with a number of radio equipped devices located in an area at a point in time;
        determine a radio tomographic map associated with the area at the point in time; and
        determine whether the area is occupied at the point in time based on the determined interference temperature and the determined radio tomographic map.

2. The computing device of claim 1, wherein:
    the computing device includes a receiver configured to receive a communication from the number of radio equipped devices indicating a status of the number of radio equipped devices at the point in time; and
    the processor is configured to execute executable instructions stored in the memory to determine whether the area is occupied at the point in time based on the received status of the number of radio equipped devices at the point in time.

3. The computing device of claim 1, wherein:
    the computing device includes a receiver configured to receive a signal emitted by the number of radio equipped devices at the point in time; and
    the processor is configured to execute executable instructions stored in the memory to:
        measure an amount of energy associated with the received signals; and
        determine the interference temperature associated with the number of radio equipped devices at the point in time based on the measured amount of energy.

4. The computing device of claim 3, wherein:
    the receiver is configured to receive a signal emitted by the number of radio equipped devices at a previous point in time at which the number of radio equipped devices are in use;
    the processor is configured to execute executable instructions stored in the memory to:
        measure an amount of energy associated with the signals received at the previous point in time;
        determine an interference temperature threshold associated with the number of radio equipped devices based on the measured amount of energy associated with the signals received at the previous point in time;
        store the interference temperature threshold in the memory; and
        determine the interference temperature associated with the number of radio equipped devices at the point in time by comparing the interference temperature threshold with the measured amount of energy associated with the signals received at the point in time.

5. The computing device of claim 4, wherein the determined interference temperature indicates one or more of the number of radio equipped devices are in use at the point in time if the measured amount of energy associated with the signals received at the point in time meets or exceeds the interference temperature threshold.

6. The computing device of claim wherein:
    the computing device includes a receiver configured to receive a signal strength measurement from a number of radio sensors located in the area at the point in time; and
    the processor is configured to execute executable instructions stored in the memory to determine the radio tomographic map associated with the area at the point in time based on the received signal strength measurements.

7. The computing device of claim 6, wherein:
    the receiver is configured to receive a signal strength measurement from the number of radio sensors at a previous point in time at which the area is not occupied; and
    the processor is configured to execute executable instructions stored in the memory to:
        determine a baseline radio tomographic map associated with the area based on the signal strength measurements received from the number of radio sensors at the previous point in time;
        store the baseline radio tomographic map in the memory; and determine the radio tomographic map associated with the area at the point in time by comparing the baseline radio tomographic map with the signal strength measurements received from the number of radio sensors at the point in time.

8. The computing device of claim 7, wherein the determined radio tomographic map indicates an individual or object is located in the area at the point in time if an attenuation between the baseline radio tomographic map and the signal strength measurements received from the number of radio sensors at the point in time exceeds a particular threshold.

9. The computing device of claim 1, wherein the computing device is a home energy manager.

10. A method for occupancy detection, comprising:
determining, using a processor, an interference temperature associated with a number of radio equipped devices located in an area at a point in time;
determining, using a processor, a path loss map associated with the area at the point in time;
receiving a communication from the number of radio equipped devices indicating whether one or more of the number of radio equipped devices are in use at the point in time; and
determining, using a processor, whether an individual is located in the area at the point in time based on the determined interference temperature, the determined path loss map, and whether the received communications indicate one or more of the radio equipped devices are in use at the point in time.

11. The method of claim 10, wherein an individual is located in the area at the point in time if:
the determined interference temperature indicates one or more of the number of radio equipped devices are in use at the point in time; and
the determined path loss map indicates an individual or object is located in the area at the point in time.

12. The method of claim 11, wherein:
one or more of the number of radio equipped devices are configured to be operated by a human while in use; and
an individual is located in the area at the point in time if the received communications indicate none of the number of radio equipped devices configured to be operated by a human while in use are in use at the point in time.

13. The method of claim 10, wherein:
one or more of the number of radio equipped devices are configured to be operated by a human while in use; and
an individual is located in the area at the point in time if the received communications indicate one or more of the number of radio equipped devices configured to be operated by a human while in use are in use at the point in time.

14. The method of claim 13, wherein:
the number of radio equipped devices are associated with a wireless communication network; and
an individual is located in the area at the point in time if:
the determined interference temperature indicates none of the number of radio equipped devices associated with the wireless communication network are in use at the point in time; and
the determined interference temperature indicates an additional device not associated with the wireless communication network is in use at the point in time.

15. The method of claim 13, wherein an individual is located in the area at the point in time if:
the determined interference temperature indicates none of the number of radio equipped devices are in use at the point in time; and
the determined path loss map indicates no individual or object is located in the area at the point in time.

16. The method of claim 10, wherein:
one or more of the number of radio equipped devices are configured to be operated by a human while in use; and
an individual is not located in the area at the point in time if:
the determined interference temperature indicates none of the number of radio equipped devices are in use at the point in time;
the determined path loss map indicates no individual or object is located in the area at the point in time; and
the received communications indicate none of the number of radio equipped devices configured to be operated by a human while in use are in use at the point in time.

17. The method of claim 10, wherein the method includes, if an individual is located in the area at the point in time, determining the location of the individual in the area at the point in time.

18. A system for occupancy detection, comprising:
a number of radio sensors located in an area, wherein each radio sensor is configured to:
send a signal to each of the other radio sensors at a point in time; and
measure a strength of a signal received from each of the other radio sensors at the point in time; and
a computing device located in the area and in communication with the number of radio sensors, wherein the computing device is configured to:
receive the signal strength measurements from the number of radio sensors;
determine a radio tomographic map associated with the area at the point in time based on the received signal strength measurements;
determine an interference temperature associated with a number of radio equipped devices located in the area at the point in time;
receive a communication from the number of radio equipped devices indicating a status of the number of radio equipped devices at the point in time; and
determine whether the area is occupied at the point in time based on the determined radio tomographic map, the determined interference temperature, and the received status of the number of radio equipped devices at the point in time.

19. The system of claim 18, wherein the computing device is in communication with the number of radio sensors via a direct communication link.

20. The system of claim 18, wherein the computing device is configured to:
receive a communication from a first number of the number of radio equipped devices indicating a status of the first number of the number of radio equipped devices at the point in time via a direct communication link with the first number of the number of radio equipped devices; and
receive a communication from a second number of the number of radio equipped devices indicating a status of the second number of the number of radio equipped devices at the point in time via an indirect communication link with the second number of the number of radio equipped devices.

* * * * *